United States Patent
Underwood (10) Patent No.: US 12,438,938 B2
(45) Date of Patent: Oct. 7, 2025

(54) RENDEZVOUS TO ENABLE CONGESTION MANAGEMENT

(71) Applicant: Hewlett Packard Enterprise Development LP, Spring, TX (US)

(72) Inventor: Keith D. Underwood, Powell, TN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/478,531

(22) Filed: Sep. 29, 2023

(65) Prior Publication Data

US 2024/0121294 A1 Apr. 11, 2024

Related U.S. Application Data

(60) Provisional application No. 63/379,079, filed on Oct. 11, 2022.

(51) Int. Cl.
*H04L 67/1004* (2022.01)
*G06F 15/173* (2006.01)

(52) U.S. Cl.
CPC .... *H04L 67/1004* (2013.01); *G06F 15/17331* (2013.01)

(58) Field of Classification Search
CPC ............. H04L 67/1004; H04L 67/1097; G06F 15/17331
See application file for complete search history.

(56) References Cited

U.S. PATENT DOCUMENTS

| | | | |
|---|---|---|---|
| 9,781,058 B1 | 10/2017 | Addepalli et al. | |
| 10,116,567 B1 | 10/2018 | Singh et al. | |
| 2007/0257813 A1 | 11/2007 | Vaswani et al. | |
| 2009/0046815 A1 | 2/2009 | Oh et al. | |
| 2009/0300209 A1* | 12/2009 | Elzur | H04L 47/10 709/242 |
| 2010/0265821 A1* | 10/2010 | Schmidt | H04L 49/30 370/230 |
| 2012/0030451 A1 | 2/2012 | Pong et al. | |
| 2012/0147750 A1 | 6/2012 | Pelletier et al. | |
| 2012/0328092 A1 | 12/2012 | Kudo | |
| 2014/0301195 A1 | 10/2014 | Briscoe et al. | |
| 2019/0140962 A1* | 5/2019 | Thottethodi | H04L 47/283 |
| 2019/0171612 A1* | 6/2019 | Shahar | G06F 15/167 |
| 2020/0084150 A1* | 3/2020 | Burstein | H04L 47/805 |
| 2020/0127981 A1 | 4/2020 | Yang et al. | |

(Continued)

*Primary Examiner* — Phuoc H Nguyen
*Assistant Examiner* — Steven C Nguyen
(74) *Attorney, Agent, or Firm* — Yao Legal Services, Inc.

(57) ABSTRACT

A network interface controller (NIC) facilitating incast management at a computing system is provided. During operation, the NIC can receive, via a network, a request to send data from a remote computing system. The NIC can determine that the request is among a plurality of requests from a plurality of remote computing systems accessible via the network. Based on a descriptor in the request, the NIC can determine a storage location of the data at the remote computing system. The NIC can then determine a level of congestion associated with the plurality of requests at the computing system. The NIC can schedule a data retrieval in response to the request based on the level of congestion and with respect to the plurality of requests. The NIC can then retrieve the data from the storage location based on remote access.

18 Claims, 9 Drawing Sheets

(56) References Cited

U.S. PATENT DOCUMENTS

| | | |
|---|---|---|
| 2020/0220713 A1 | 7/2020 | Li et al. |
| 2020/0259799 A1 | 8/2020 | Li et al. |
| 2020/0279060 A1 | 9/2020 | Mcgraw |
| 2020/0374745 A1 | 11/2020 | Sayenko et al. |
| 2021/0112002 A1 | 4/2021 | Pan et al. |
| 2022/0103465 A1 | 3/2022 | Zhu et al. |
| 2022/0103484 A1* | 3/2022 | Penaranda Cebrian ................... H04L 47/25 |
| 2022/0124035 A1* | 4/2022 | Lee ........................ H04L 47/12 |
| 2022/0200801 A1 | 6/2022 | Potlapally et al. |
| 2022/0413886 A1 | 12/2022 | Griffy et al. |
| 2023/0084956 A1 | 3/2023 | Robison et al. |
| 2023/0185606 A1 | 6/2023 | Menes et al. |
| 2023/0281153 A1* | 9/2023 | Hansen ............. G06F 15/17331 709/212 |
| 2023/0336490 A1 | 10/2023 | Arslan et al. |
| 2023/0376450 A1* | 11/2023 | Ranadive .............. G06F 9/3867 |

* cited by examiner

RENDEZVOUS TO ENABLE CONGESTION MANAGEMENT

RELATED APPLICATION

This application claims the benefit of U.S. Provisional Application No. 63/379,079, titled "Systems and Methods for Implementing Congestion Management and Encryption," by inventors Keith D. Underwood and Duncan Roweth, filed 11 Oct. 2022.

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

High-performance computing (HPC) can often facilitate efficient computation on the nodes running an application. HPC can facilitate high-speed data transfer between sender and receiver devices.

BRIEF DESCRIPTION OF THE FIGURES

In the figures, like reference numerals refer to the same figure elements.

DETAILED DESCRIPTION

As applications become progressively more distributed, HPC can facilitate efficient computation on the nodes running an application. An HPC environment can include compute nodes, storage nodes, and high-capacity switches coupling the nodes. Typically, the compute nodes can be formed into a cluster. The cluster can be coupled to the storage nodes via a network. The compute nodes may run one or more applications run in parallel in the cluster. The storage nodes can record the output of computations performed on the compute nodes. Therefore, the compute and storage nodes can operate in conjunction with each other to facilitate high-performance computing.

To ensure the expected performance level, a respective node needs to operate at the operating rate of other nodes. For example, a storage node needs to receive a piece of data from a compute node as soon as the compute node generates the data. Here, the storage and compute nodes can operate as receiver and sender devices, respectively. On the other hand, if the compute node obtains a piece of data from a storage node, the storage and compute nodes can operate as sender and receiver devices, respectively. Furthermore, the switches of the network need to transfer the piece of data at high speed to ensure low-latency data transfer. When many sender devices attempt to send data to a receiver device, an incast occurs in the network, leading to a high level of congestion at the receiver device. Therefore, a high-performance network, such a datacenter network, can require mechanisms to mitigate congestion during incast in the network to ensure high-speed data transfer.

The aspects described herein address the problem of efficient data transfer in a network during incast at a receiver device by (i) obtaining a descriptor of a piece of data from a transmit request received from a sender device; (ii) scheduling a corresponding file retrieval based on a level of congestion at the receiver device; and (iii) remotely retrieve the data from a location indicated in the descriptor at the scheduled time. Because the receiver device is aware of all transfer requests from a plurality of sender devices, the receiver device can efficiently determine when to retrieve data from each piece of data. To do so, the receiver device can schedule the retrievals to avoid conflicts among them. When the receiver device is ready to obtain a piece of data from a particular sender device, the receiver device can use Remote Direct Memory Access (RDMA) to get the data without interacting with the corresponding application on the sender device.

With existing technologies, data transfers from multiple sender devices to a receiver device can cause congestion and reduce the throughput of the data flows at the switches. Such a many-to-one communication pattern can be referred to as "incast." Typically, to mitigate the impact of incast, the receiver device can throttle traffic from the sender devices. The receiver device can then schedule the transmissions from the sender devices and send transmit credits to individual sender devices based on the schedule. The credits allow the sender devices to transmit data to the receiver device as indicated by the corresponding credits. However, because the receiver device cannot control how the sender devices may schedule the transmission, the switches in the network may still experience congestion.

Furthermore, to transfer the data, a sender device may include the data in packets. This can lead to out-of-order packet arrival at the receiver device. The out-of-order packet arrival can require sequence numbers in the packets. In some examples, data transmission via a network may require that header information be ordered. However, the payload data associated with the header information may not need to be ordered in the same way that header information is ordered. Typically, the data transmission may use one stream of packets where header information is included with the payload data in the packets. Under such circumstances, the packets are ordered according to the header information. Some existing congestion management solutions may utilize multiple paths through the network where the sender device sprays packets across multiple paths to avoid congestion on a particular path. Consequently, the sender and receiver devices must maintain extensive and resource-intensive mechanisms to facilitate packet reordering. Incast in the network can further exacerbate packet losses in the network and put further strain on the packet reordering mechanisms.

To address this problem, the receiver device can schedule the sender devices' transmissions based on the level of congestion at the receiver device. The level of congestion can depend on the degree of incast. Instead of granting a transmit credit to a sender device and allowing the sender device to determine when to transmit, the receiver device can perform a data retrieval operation from the sender device. As a result, the receiver device can control when the retrieved data traverses the network. During operation, when a sender application on the sender device needs to send a piece of data to a corresponding application on a receiver device, the application can notify a NIC of the sender device. The NIC of the sender device can be referred to as a sender NIC.

The sender NIC can then retrieve the piece of data (e.g., from a memory location allocated to the application) and store it in a sender buffer of the NIC. Subsequently, the sender NIC can send a transmit request for sending the data. The request can include a descriptor for the data. The descriptor can indicate the location of the data. The location can include a memory location of the piece of data in the sender buffer. When the NIC of the receiver device, which can be referred to as a receiver NIC, receives the request, the receiver NIC can allocate a location in a receiver buffer of the NIC. The receiver buffer can be allocated to a data flow associated with the piece of data.

The receiver NIC can retrieve the data from the location specified in the descriptor. The retrieval process can bypass active participation from the application. The receiver NIC can use RDMA to retrieve the data from the sender buffer in the sender NIC. Because the receiver device can pull the data from the sender buffer instead of asking the sender device to send the data, the receiver device can control when the data arrives. Accordingly, the receiver device can schedule the retrievals to avoid conflicts among them. By retrieving data based on the schedule, the receiver NIC can arrange how the data from the sender devices would traverse the network. This efficient retrieval-based incast management system can mitigate the impact of incast and reduce congestion in the network.

In addition, the retrieval process may operate in conjunction with a credit-based congestion management system. For example, a level of congestion at the receiver device reaches a threshold, the receiver device may switch from the credit-based system to the retrieval-based system. The level of congestion can correspond to the degree of incast, which indicates the number of sender devices sending transmit requests to the receiver device. Accordingly, the threshold can indicate one or more of: a predetermined number of sender devices and a predetermined level or percentage of utilization of a receiver buffer receiving data from the sender devices. For example, if the number of sender devices sending transmit requests reaches a predetermined number (i.e., the threshold), the switchover to the retrieval-based system can trigger. On the other hand, if the level of congestion reaches a higher threshold (e.g., a high watermark), the receiver device can pause data retrieval for a predetermined period. This can allow the receiver device to clear pending transmissions. Subsequently, when the period expires, and the level of congestion falls below the higher threshold, the receiver device can restart the scheduling process.

Furthermore, the receiver device can keep track of successful data retrievals. In particular, since each piece of retrieved data can be placed at a predetermined location in the receiver buffer, the locations can be indicative of the order of the received data. Accordingly, based on the location of a retrieved piece of data in the receiver buffer, the receiver NIC can determine whether the data has arrived in order. If the data is retrieved out of order, the data can remain in the allocated location. When the receiver NIC receives all data in order, the receiver NIC may promote the data to the application. The out-of-order data retrieval can then reduce the need for the reordering mechanism at the receiver device.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1A:
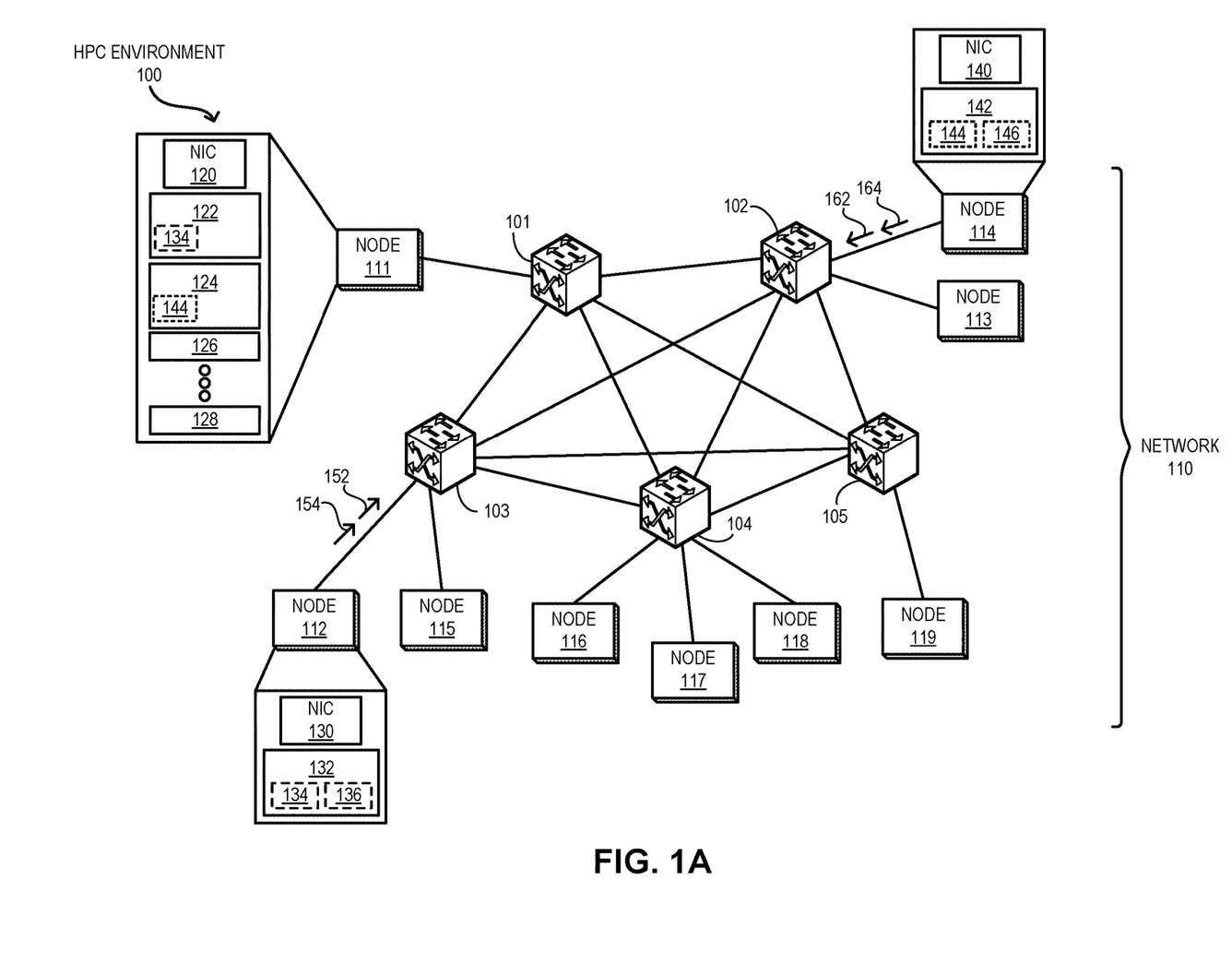
FIG. 1A illustrates an example of receiver-driven incast management for data retrieval, in accordance with an aspect of the present application.

FIG. 1A illustrates an example of receiver-driven incast management for data retrieval, in accordance with an aspect of the present application. An HPC environment 100 can include a number of nodes 111, 112, 113, 114, 115, 116, 117, 118, and 119. A subset of these nodes can be compute nodes, while the others can be storage nodes. The nodes can be coupled to each other via a network 110. When a respective node can operate as a receiver or sender device. The node can then be referred to as a receiver or sender device, respectively. Network 110 can include a set of high-capacity switches 101, 102, 103, 104, and 105. Here, network 110 can be an HPC fabric. The compute and storage nodes can operate in conjunction with each other through network 110 to facilitate high-performance computing in HPC environment 100.

A subset of the switches in network 110 can be coupled to each other via respective tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in network 110 can be formed over an underlying network (or an underlay network). The underlying network can be a physical network, and a respective link of the underlying network can be a physical link. A respective switch pair in the underlying network can be a Border Gateway Protocol (BGP) peer. A VPN, such as an Ethernet VPN (EVPN), can be deployed over network 110.

To ensure the expected performance level, a respective node in HPC environment 100 can operate at the operating rate of other nodes. Suppose that node 111 operates as a receiver device. At least a subset of the rest of the nodes in environment 100 can then operate as sender devices. Switches 101, 102, 103, 104, and 105 can facilitate low-latency data transfer from a respective sender device to receiver device 111 at high speed. When a large number of sender devices attempt to send data to receiver device 111, an incast occurs in network 110, which can lead to a high level of congestion at receiver device 111 and associated switches. Therefore, to ensure high-speed data transfer, HPC environment 100 can require mechanisms to mitigate congestion during incast.

With existing technologies, data transfers from multiple sender devices, such as sender devices 112 and 114, to a receiver device can cause congestion and reduce the throughput of the data flows (e.g., at switch 101 coupling receiver device 111). When the incast occurs, receiver device 111 can throttle traffic from sender devices to mitigate the impact of the incast. Receiver device 111 can then schedule the transmissions from the sender devices and send transmit credits to individual sender devices, such as sender devices 112 and 114, based on the schedule. The credits allow sender devices 112 and 114 to transmit data to receiver device 111, as indicated by the corresponding credits. However, because receiver device 111 cannot control how sender devices 112 and 114 may schedule the transmission, the switches in network 110 may still experience congestion.

Furthermore, to transfer data, sender devices 112 and 114 may include the data in a set of packets. However, due to the lossy nature of network 110, one or more packets may be lost. This can lead to out-of-order packet arrival at receiver device 111. The out-of-order packet arrival can require sequence numbers in the packets. As a result, sender devices 112 and 114 and receiver device 111 need to maintain extensive and resource-intensive mechanisms to facilitate packet reordering. Incast in network 110 can further exacerbate packet losses in network 110 and further strain the packet reordering mechanisms.

To address this problem, receiver device 111 can schedule transmission from sender devices 112 and 114 based on a level of congestion (e.g., indicated by a degree of incast) at receiver device 111. Instead of granting a transmit credit to sender device 112 (or sender device 114) and allowing sender device 112 to determine when to transmit, receiver device 111 can perform a data retrieval operation from sender device 112. As a result, receiver device 111 can control when the retrieved data can traverse network 110. During operation, when a sender application on sender device 112 needs to send data 134 and 136 to receiver device 111, the application can notify NIC 130 of sender device 112. Similarly, when a sender application on sender device 114 needs to send data 144 and 146 to receiver device 111, the application can notify NIC 140 of sender device 114.

NIC 130 can then receive an instruction from sender device 112 with memory location of data 134 and 136 in a memory device 132 of sender device 112. Similarly, NIC 140 can receive an instruction from sender device 114 with memory location of data 144 and 146 in a memory device 142 of sender device 114. Subsequently, NIC 130 can send transmit request 152 for sending data 134. Request 152 can include a descriptor for data 134. The descriptor can indicate the location of data 134, which can include a memory location of data 134 in memory device 132. When NIC 120 of receiver device 111 receives request 152, NIC 120 can allocate a location in a receiver buffer 122 in a memory device of receiver device 111. Receiver buffer 122 can be allocated to sender buffer 132 (i.e., as a queue pair). Similarly, NIC 140 can send transmit request 162 with a descriptor for data 144. The descriptor can indicate the memory location of data 144 in buffer 142.

When NIC 120 receives request 162, NIC 120 can allocate a location in a receiver buffer 124. However, if request 162 arrives at NIC 120 before buffer 124 is allocated (e.g., as an unexpected request), the processing of request 162 can be deferred until buffer 124 is allocated. Receiver buffer 124 can be allocated to sender buffer 142. In this way, NIC 120 can maintain number buffers 122, 124, 126, and 128, each for a corresponding sender buffer. NIC 120 can retrieve data 134 and 144 from the locations specified in corresponding descriptors of requests 152 and 162, respectively. The retrieval process can bypass active participation from the application. NIC 120 can use RDMA to retrieve data 134 and 144. For example, NIC 120 can use RDMA GET packets (e.g., datagrams) 154 and 164, respectively, to retrieve data from buffers 132 and 142. Because NIC 120 can pull data 134 and 144 from buffers 132 and 142, respectively, NIC 120 can control when data 134 and 144 can arrive at receiver device 111. Here, NICs 120, 130, and 140 can use a rendezvous protocol supported by the HPC fabric. The rendezvous protocol facilitates large data transfer based on message passing. In accordance with the rendezvous protocol, a sender device can a transmit request as a control signal to a receiver device. Upon receiving the transmit request, the receiver device can issue a read signal based on remote memory access, such as an RDMA GET message. The read signal can fetch the data from the sender device from a location indicted in the transmit request without involving the sender device's processor.

By retrieving data based on the schedule, NIC 120 can arrange how data 134 and 144 would traverse network 110. This efficient retrieval-based incast management system can mitigate the impact of incast and reduce congestion in network 110. In addition, the retrieval process may operate in conjunction with a credit-based congestion management system. For example, if the level of congestion or the degree of incast reaches a threshold, receiver device 111 may switch from the credit-based system to the retrieval-based system. The threshold can indicate one or more of: a predetermined number of sender devices and a predetermined level or percentage of utilization of a receiver buffer. On the other hand, if the level of congestion reaches a high threshold (e.g., a high watermark), receiver device 111 can pause data retrieval for a predetermined period. Subsequently, when the period expires and the level of congestion falls below the high threshold, receiver device 111 can restart scheduling for data retrieval.

Figure 1B:
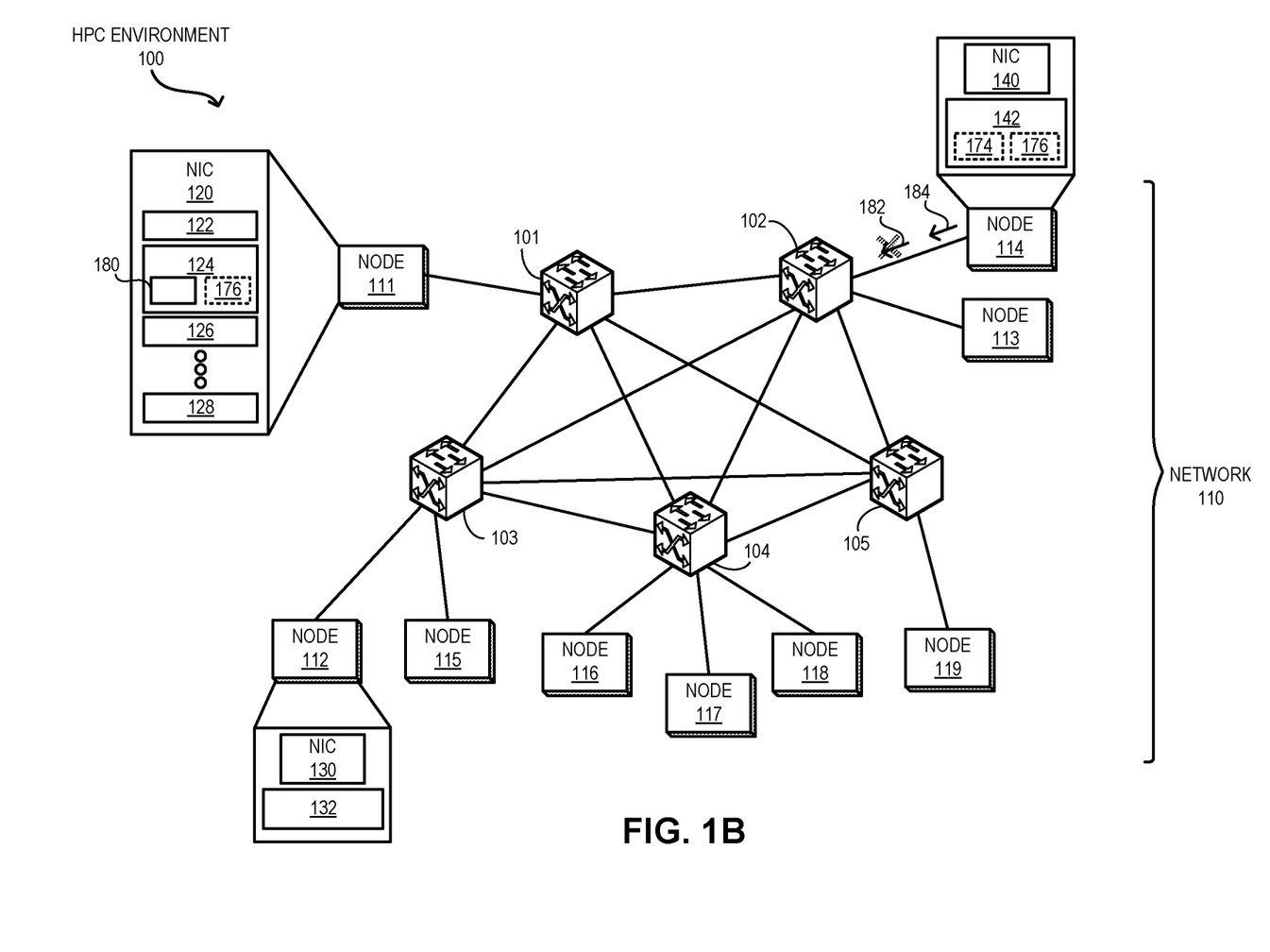
FIG. 1B illustrates an example of unordered data retrieval, in accordance with an aspect of the present application.

FIG. 1B illustrates an example of unordered data retrieval, in accordance with an aspect of the present application. NIC 120 can also keep track of successful data retrievals. Sender buffer 142 in NIC 140 can include data 174 and 176 for transferring to NIC 120. NIC 120 can allocate a predetermined location for each of data 174 and 176 in buffer 124. Hence, the locations in buffer 124 can be indicative of the order of the received data from buffer 142. Based on the location of data 174 and 176 in buffer 124, NIC 120 can determine whether data 174 and 176 arrived in order. Suppose that NIC 120 uses RDMA GET packets 182 and 184 to obtain data 174 and 176, respectively. Packet 182 can be lost in network 110 (denoted with a cross). Hence, NIC 120 can receive data 176 out of order.

However, location 180 in buffer 124 allocated for data 174 can remain unused. Hence, NIC 120 can determine that data 176 is not in order. Data 176 can then remain in its location in buffer 124. NIC 120 can retry the retrieval of data 174 from buffer 142. When NIC 120 receives data 174, NIC 120 can determine that data 174 and 176 are stored in order in buffer 124. NIC 120 can then promote data 174 and 176 to the application. The out-of-order data retrieval can then reduce the need for the reordering mechanism at receiver device 111.

Figure 2:
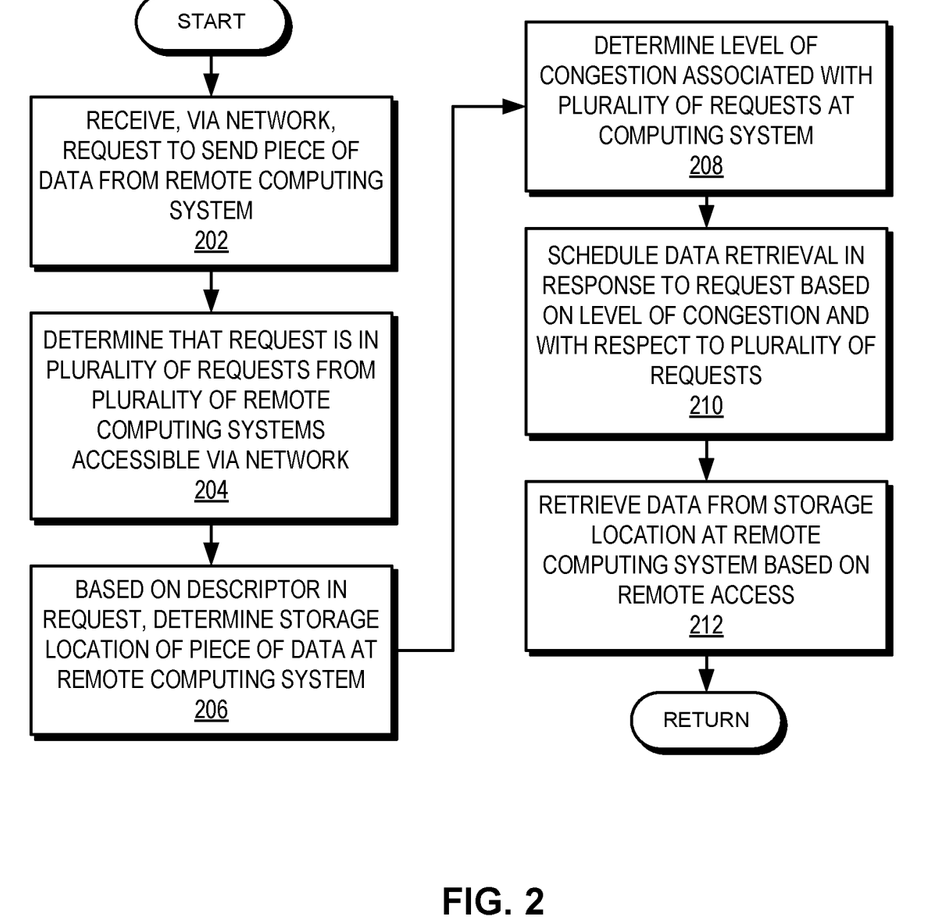
FIG. 2 presents a flowchart illustrating an example of a process of a network interface controller (NIC) of a computing system using rendezvous to enable congestion management, in accordance with an aspect of the present application.

FIG. 2 presents a flowchart illustrating an example of a process of a NIC of a computing system using rendezvous to enable congestion management, in accordance with an aspect of the present application. During operation, the NIC can receive, via a network, a request to send a piece of data from a remote computing system (operation 202). The NIC can determine that the request is in a plurality of requests from a plurality of remote computing systems accessible via the network (operation 204). Based on a descriptor in the request, the NIC can determine a storage location of the piece of data at the remote computing system (operation 206). The NIC can then determine a level of congestion associated with the plurality of requests at the computing system (operation 208). Subsequently, the NIC can schedule a data retrieval in response to the request based on the level of congestion and with respect to the plurality of requests (operation 210). Accordingly, the NIC can retrieve the data from the storage location at the remote computing system based on remote access (operation 212).

Figure 3:
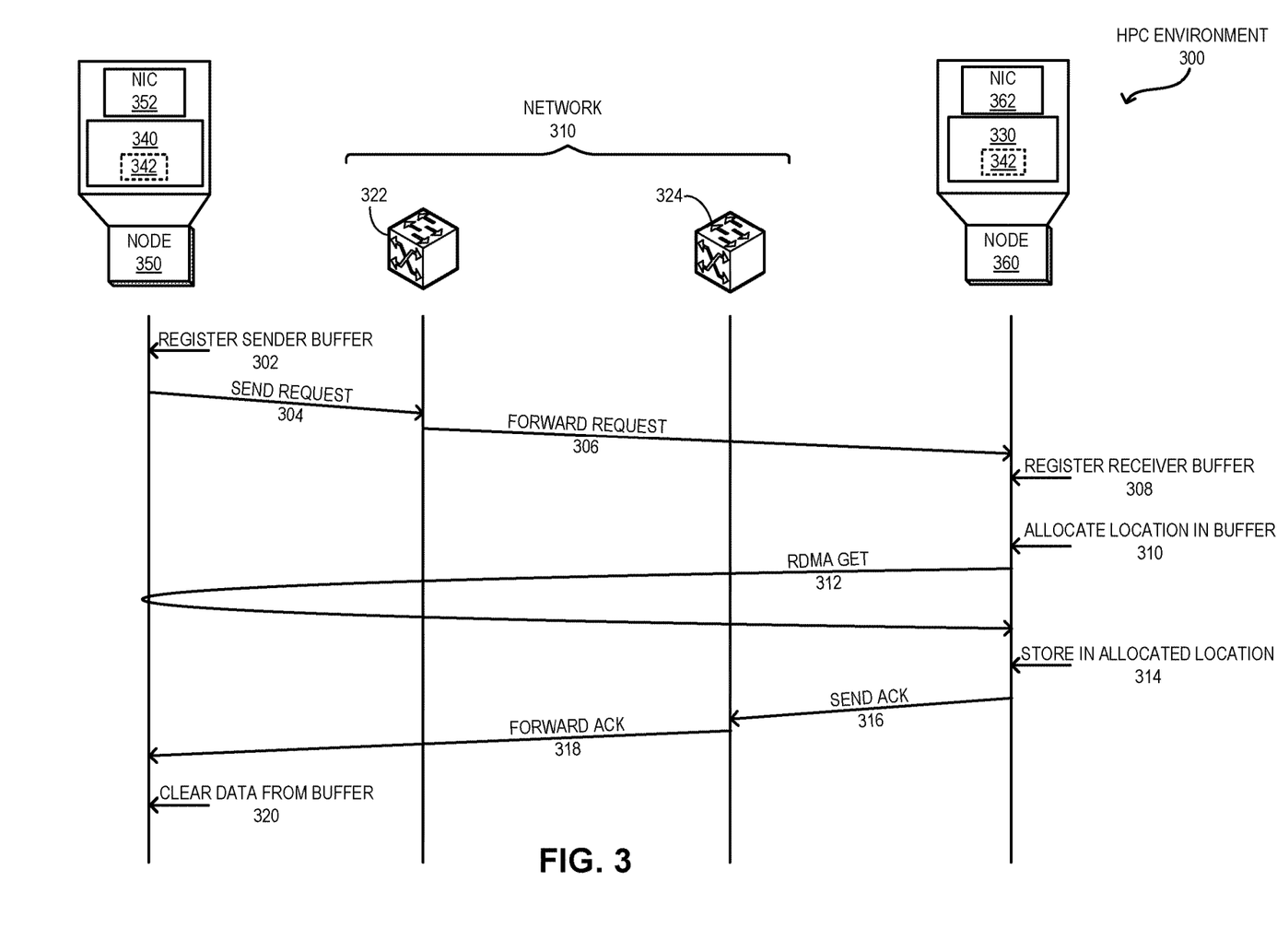
FIG. 3 illustrates an example of communication facilitating receiver-driven incast management, in accordance with an aspect of the present application.

FIG. 3 illustrates an example of communication facilitating receiver-driven incast management, in accordance with an aspect of the present application. An HPC environment 300 can include a network 310 comprising switches 322 and 324. In this example, nodes 350 and 360 of environment 300 can operate as sender and receiver devices, respectively. During operation, NIC 352 of sender device 350 can register a sender buffer 340 (e.g., located in the memory device of sender device 350) (operation 302). Buffer 340 can include a piece of data 342 that needs to be transferred to receiver device 360. Upon receiving a request, NIC 352 may obtain data 342 (e.g., using the memcpy operation) from the memory of sender device 350. NIC 352 can then send a transmit request to receiver device 360 via locally coupled switch 324 (operation 304).

In some examples, NIC 352 may also incorporate a "work complete" record in a completion queue associated with buffer 340. NIC 352 may, optionally, consider the transfer of data 342 as complete because NIC 362 can be responsible for retrieving data 342. Switch 322 can then forward the request via network 310 to receiver device 360 (operation 306). The request can include a descriptor of data 342. Upon receiving the request, NIC 362 can determine the location of data 342. NIC 362 can also register a receiver buffer 330 (e.g., located in the memory device of receiver device 360) as a corresponding buffer of buffer 340 (operation 308). NIC 362 can also allocate a location for data 342 in buffer 320 (operation 310). NIC 362 can use RDMA GET to retrieve data 342 from buffer 340 (operation 312). Here, NICs 362 and 352 can use a rendezvous protocol supported by the HPC fabric.

When NIC 362 receives data 342 (e.g., from an RDMA GET packet), NIC 362 can store data 342 in the allocated location in buffer 340 (operation 314). RDMA can be facilitated by a network library instantiated on NICs 362 and 352. Examples of the network library can include, but are not limited to, a Message Passing Interface (MPI), a partitioned global address space library (e.g., OpenSHMEM), and a Collective Communication Library (CCL) (e.g., the NVIDIA© CCL or NCCL). NIC 362 can also send an acknowledgment, which can include a short message, indicating that NIC 362 has received data 342 (operation 316). Locally coupled switch 101 can receive the acknowledgment and forward it to sender device 350 via network 110 (operation 318). NIC 352 can then clear data 342 from buffer 340 (operation 320).

Figure 4A:
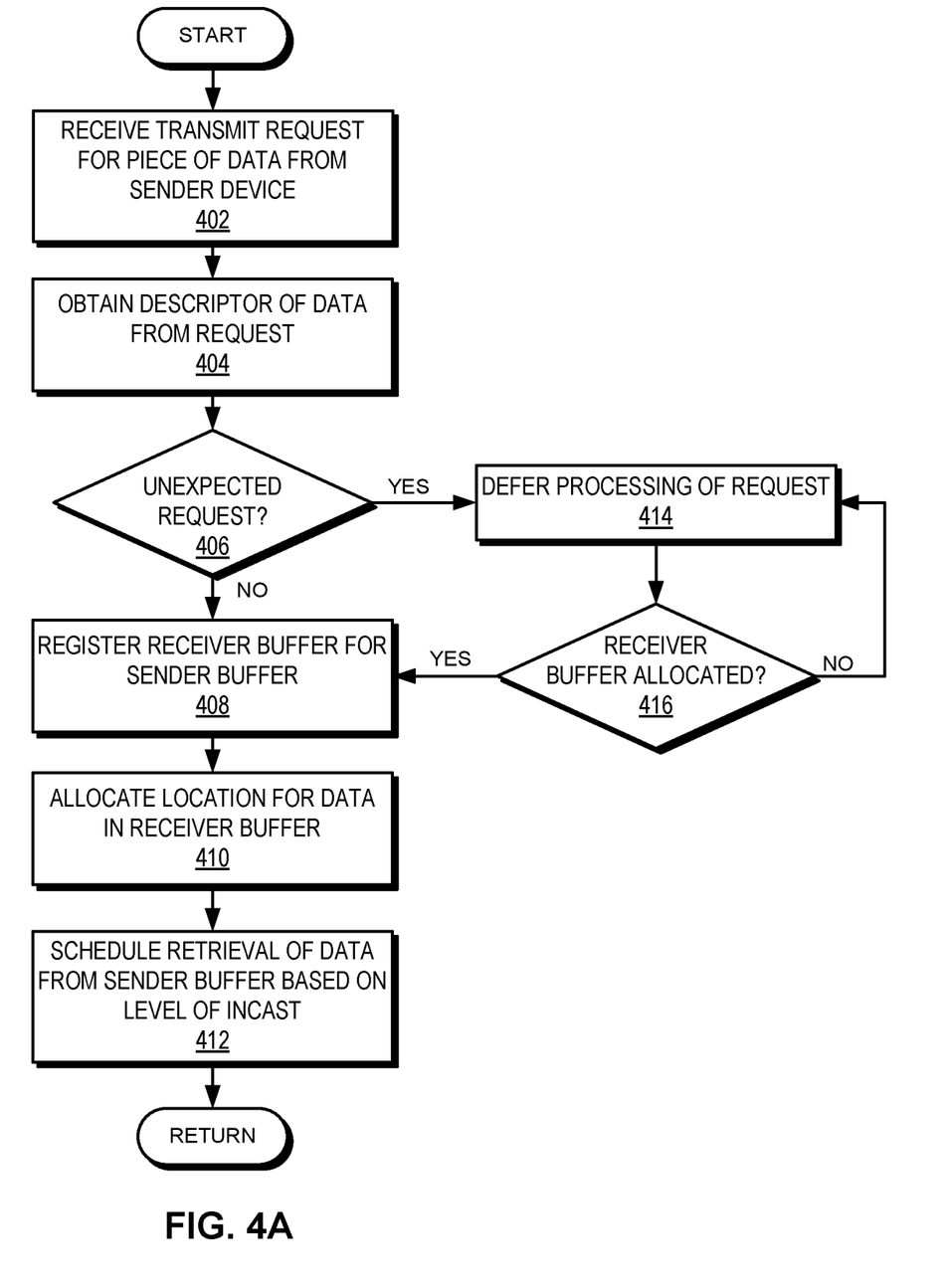
FIG. 4A presents a flowchart illustrating an example of a process of a receiver device scheduling data retrieval in response to a transfer request, in accordance with an aspect of the present application.

FIG. 4A presents a flowchart illustrating an example of a process of a receiver device scheduling data retrieval in response to a transfer request, in accordance with an aspect of the present application. During operation, the receiver device can receive a transmit request for a piece of data from a sender device (operation 402). The transmit request can be a remote memory access request. The receiver device can then obtain a descriptor of the data from the request (operation 404). The descriptor can include the location of the data in a memory device of the sender device. The receiver device can then determine whether the request is an unexpected request (e.g., arrived before the local buffer is registered for the data flow) (operation 406). If the request is unexpected, the processing of the request can be deferred until a buffer is allocated (operation 414). The receiver device can then determine whether a receiver buffer is allocated for the sender buffer (operation 416).

If a receiver buffer is not allocated, the processing of the request can continue to be deferred until the buffer is allocated (operation 414). If the request is not unexpected (operation 406) or upon allocating the receiver buffer (operation 416), the receiver device can register the receiver buffer for the sender buffer (operation 408). In this way, the data retrieved from the sender buffer can be stored in the receiver buffer. The receiver device can then allocate a location for the data in the receiver buffer (operation 410). The receiver device can schedule the retrieval of the data from the sender buffer based on a level of incast (operation 412). In this way, the receiver device can schedule when to retrieve the data based on the level of congestion and with respect to the number of sender devices requesting data retrieval. Based on the scheduling, the receiver device can mitigate the impact of incast.

Figure 4B:
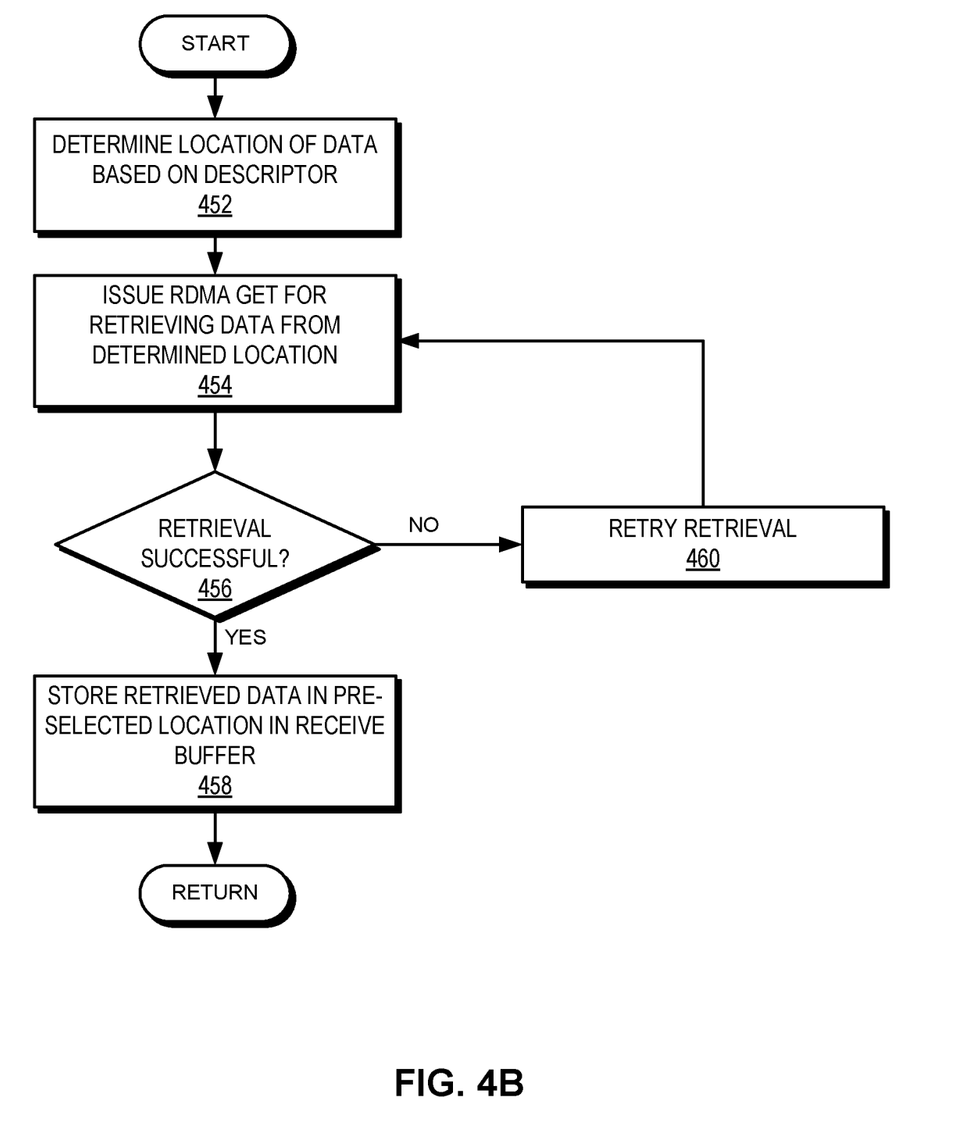
FIG. 4B presents a flowchart illustrating an example of a process of a receiver device retrieving a piece of data from a sender device at a scheduled time, in accordance with an aspect of the present application.

FIG. 4B presents a flowchart illustrating an example of a process of a receiver device retrieving a piece of data from a sender device at a scheduled time, in accordance with an aspect of the present application. During operation, the receiver device can determine the location of the data based on a descriptor, which can be obtained from a corresponding transmit request, of the data (operation 452) and issue an RDMA GET for retrieving the data from the determined location (operation 454). The RDMA GET can obtain the data from a memory device storing the data at the sender device. The receiver device can determine whether the retrieval is successful (operation 456). The RDMA GET process can provide a mechanism based on which the receiver device can determine successful retrieval.

If the retrieval is not successful, the receiver device can retry the retrieval (operation 460) and continue to issue the RDMA GET for retrieving the data (operation 454). On the other hand, if the retrieval is successful, the receiver device can store retrieved data in a pre-selected location in the receive buffer (operation 458). Because the location of the retrieved data is preselected, the retrieval can be unordered without relying on a sequence number. In this way, if the receiver device maintains the order of the requests-to-send operations in order (e.g., by using an ordering scheme), the data may then be retrieved in any order and delivered to the memory of the receiver device in any order.

Figure 5:
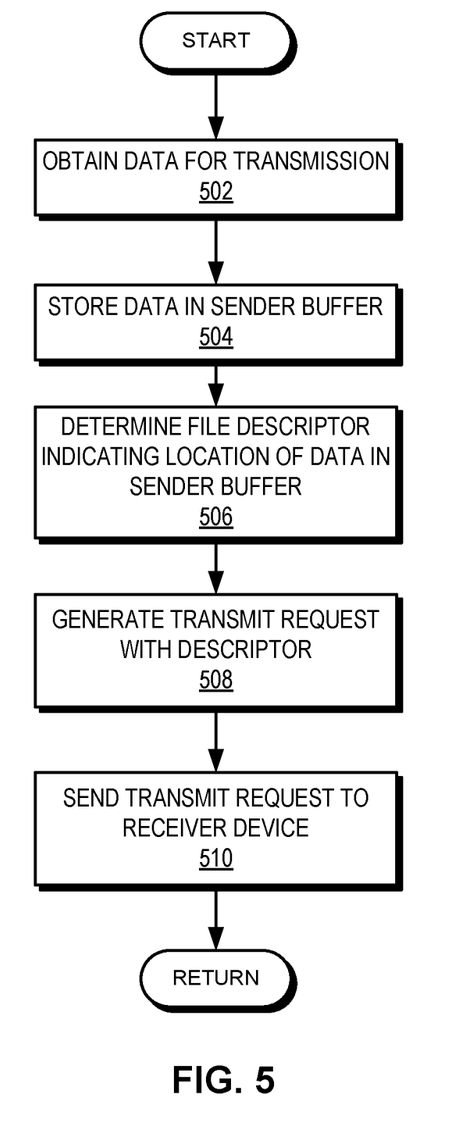
FIG. 5 presents a flowchart illustrating an example of a process of a sender device sending a transfer request to a receiver device, in accordance with an aspect of the present application.

FIG. 5 presents a flowchart illustrating an example of a process of a sender device sending a transfer request to a receiver device, in accordance with an aspect of the present application. During operation, the sender device can obtain data for transmission (operation 502) (e.g., from a distributed application). The sender device can store the data in a sender buffer (operation 504). The sender buffer can be in a memory device of the sender device. The sender device can then determine a descriptor indicating the location of the data in the sender buffer (operation 506). The sender device can then generate a transmit request with the descriptor (operation 508) and send the transmit request to the receiver device (operation 510). Here, the transmit request can be an RDMA request.

Figure 6:
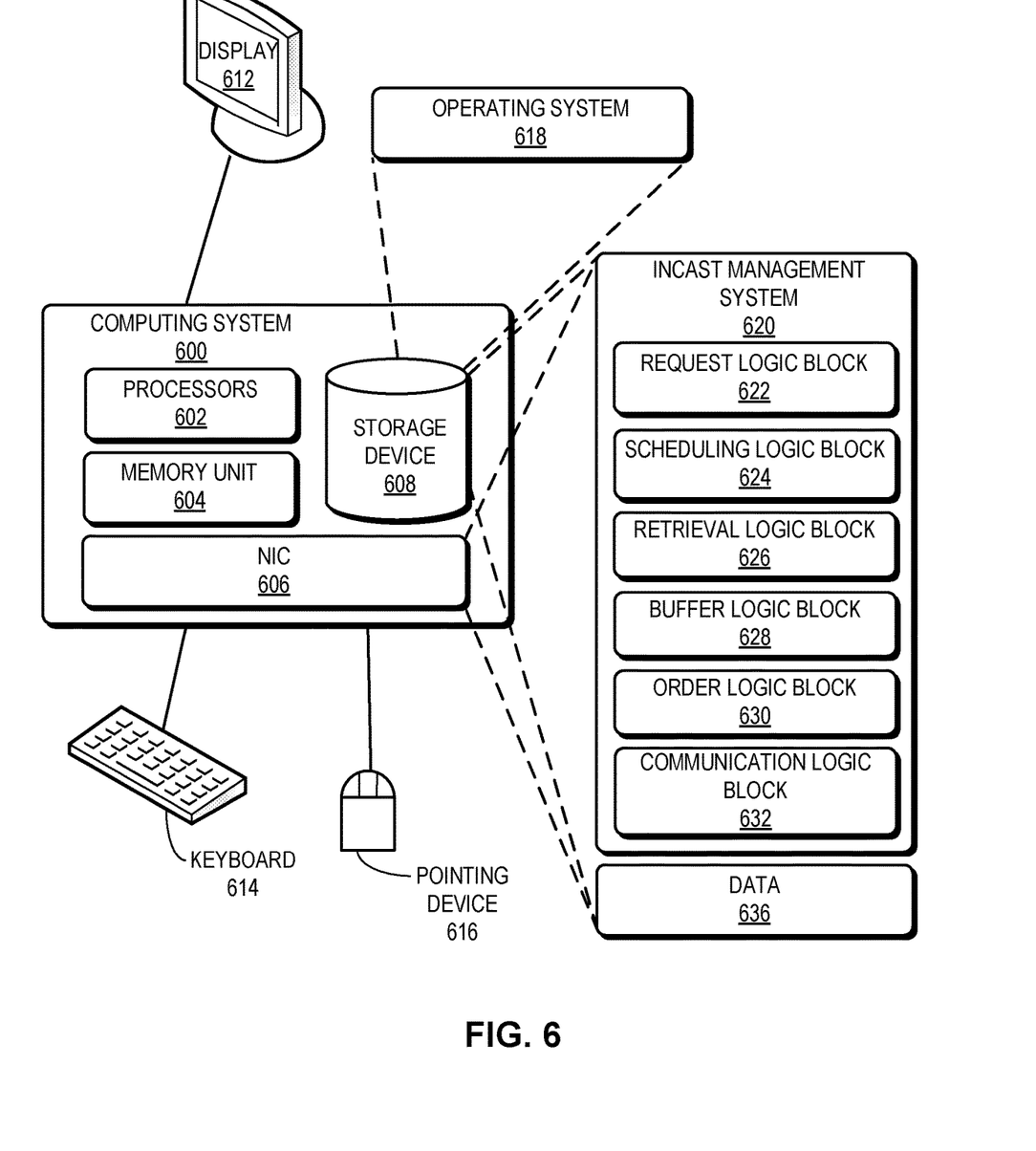
FIG. 6 illustrates an example of a computing system facilitating receiver-driven incast management using data retrieval, in accordance with an aspect of the present application.

FIG. 6 illustrates an example of a computing system facilitating receiver-driven incast management using data retrieval, in accordance with an aspect of the present application. A computing system 600 can include a set of processors 602, a memory unit 604, a NIC 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage device 608 can store an operating system 618. An incast management system 620 and data 636 associated with incast management system 620 can be maintained and executed from storage device 608 and/or NIC 606.

Incast management system 620 can include instructions, which when executed by computing system 600, can cause computing system 600 to perform methods and/or processes described in this disclosure. Specifically, if computing system 600 is a sender device, incast management system 620 can include instructions for sending a transmit request for a piece of data with a descriptor to a receiver device (request logic block 622). Incast management system 620 can also include instructions for storing the data in a sender buffer (e.g., in NIC 606) (buffer logic block 628).

On the other hand, if computing system 600 is a receiver device, incast management system 620 can include instructions for receiving a transmit request and obtaining a descriptor from the request (request logic block 622). Incast management system 620 can also include instructions for scheduling the retrieval of the data from a sender device based on a level of congestion, as indicated by the degree of incast (scheduling logic block 624). The degree of incast can depend on the number of sending devices. Furthermore, incast management system 620 can include instructions for remotely retrieving the piece of data from the location indicated in the descriptor included in the request (e.g., using RDMA) (retrieval logic block 626).

Incast management system 620 can further include instructions for allocating a location for the data in the receiver buffer (buffer logic block 628). Moreover, incast management system 620 can include instructions for storing the retrieved data in the allocated location (buffer logic block 628). Incast management system 620 can also include instructions for determining whether the data is retrieved in order (order logic block 630). In addition, incast management system 620 can also include instructions for promoting the data that has been retrieved in order (order logic block 630).

Incast management system 620 may further include instructions for sending and receiving packets (communication logic block 632). Data 636 can include any data that can facilitate the operations of incast management system 620. Data 636 can include, but is not limited to, a descriptor, data to be transmitted, out-of-order data, and completion records.

Figure 7:
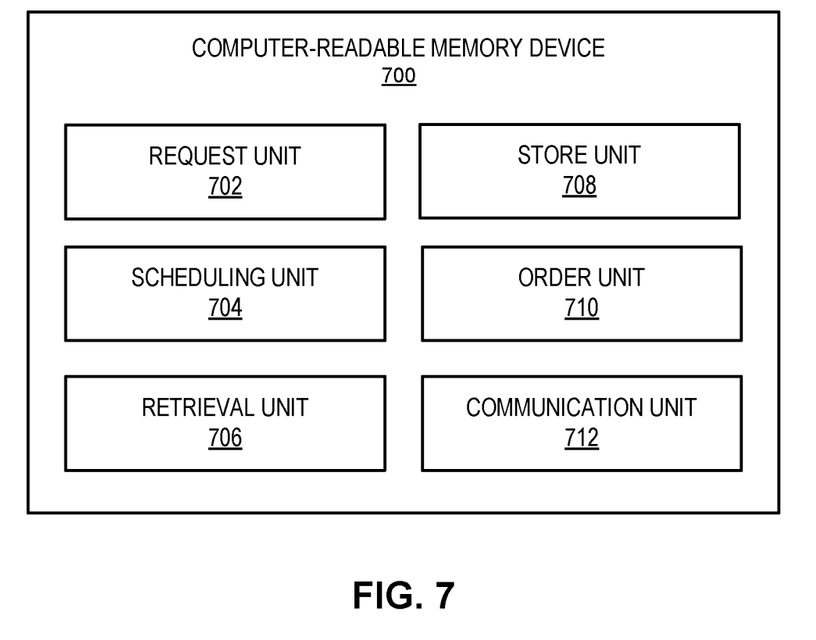
FIG. 7 illustrates an example of a non-transitory computer-readable memory device that facilitates receiver-driven incast management using data retrieval, in accordance with an aspect of the present application.

FIG. 7 illustrates an example of a non-transitory computer-readable memory device that facilitates receiver-driven incast management using data retrieval, in accordance with an aspect of the present application. Computer-readable memory device 700 can comprise a plurality of units or apparatuses which may communicate with one another via a wired, wireless, quantum, light, or electrical communication channel. Memory device 700 may be realized using one or more integrated circuits, and may include fewer or more units or apparatuses than those shown in FIG. 7.

Further, memory device 700 may be integrated with a computer system. For example, memory device 700 can be in a NIC of a computer system. Memory device 700 can comprise units 702-712, which perform functions or operations similar to logic blocks 622-632 of incast management system 620 of FIG. 6, including: a request unit 702; a scheduling unit 704, a retrieval unit 706; a store unit 708; an order unit 710; and a communication unit 712.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a NIC facilitating efficient incast management at a computing system. During operation, the NIC can receive, via a network, a request to send data from a remote computing system. The NIC can determine that the request is among a plurality of requests from a plurality of remote computing systems accessible via the network. Based on a descriptor in the request, the NIC can determine a storage location of the data at the remote computing system. The NIC can then determine a level of congestion associated with the plurality of requests at the computing system. Subsequently, the NIC can schedule a data retrieval in response to the request based on the level of congestion and with respect to the plurality of requests. The NIC can then retrieve the data from the storage location at the remote computing system based on remote access.

In a variation on this aspect, to schedule the data retrieval, the NIC can determine whether the level of congestion is greater than a threshold value that indicates a predetermined number of computing systems sending data to the computing system. If the level of congestion is greater than the threshold value, the NIC can pause the scheduling for a predetermined period.

In a variation on this aspect, the storage location of the data at in a sender buffer of the remote computing system.

In a variation on this aspect, the NIC can determine a location for storing the data in a receiver buffer at the computing system. The NIC can then store the data at the determined location.

In a further variation, the data can be retrieved without relying on a sequence number.

In a variation on this aspect, the computing system can be a receiver device. The remote computing system can then be a sender device.

In a variation on this aspect, the remote access can be based on Remote Direct Memory Access (RDMA) from the NIC.

In a variation on this aspect, the network can include a high-performance computing (HPC) fabric that supports the retrieval of the data. Here, the retrieval of the data can be based on a rendezvous protocol supported by the HPC fabric. The rendezvous protocol can support sending of the transmit request for the data and retrieval of the data based on remote access.

In a variation on this aspect, the level of congestion is determined based on a degree of incast at the computing system caused by the plurality of remote computing systems.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computing system, comprising:
a memory device; and
a network interface controller (NIC) to:
receive, via a network from a remote computing system storing a first piece of data, a first request to send the first piece of data to the computing system, wherein the network includes a high-performance computing (HPC) fabric that supports the retrieval of the first piece of data based on a rendezvous protocol supported by the HPC fabric, and wherein the rendezvous protocol supports sending of the first request for the first piece of data and retrieval of the first piece of data based on remote memory access; determine that the first request is among a plurality of requests to send data to the computer system received from a plurality of remote computing systems accessible via the network;
determine a storage location of the first piece of data at the remote computing system based on a descriptor in the first request;
determine a number of the plurality of requests as a degree of incast at the computing system;
schedule a time for retrieval of the first piece of data in response to the first request based on the degree of incast and with respect to the plurality of requests; and
retrieve, at the scheduled time, the first piece of data from the storage location at the remote computing system to the NIC based on the rendezvous protocol.

2. The computing system of claim 1, wherein, to schedule the retrieval of the first piece of data, the NIC is to:
determine whether the degree of incast is greater than a threshold value that indicates a predetermined number of computing systems sending data to the computing system; and
in response to the degree of incast being greater than the threshold value, pause the scheduling for a predetermined period.

3. The computing system of claim 1, wherein the storage location of the first piece of data at the remote computing system is in a sender buffer of the remote computing system.

4. The computing system of claim 1, wherein the NIC is further to:
determine, prior to retrieving the first piece of data, a location for storing the first piece of data in a receiver buffer at the computing system; and
store the first piece of data at the determined location in response to retrieving the first piece of data.

5. The computing system of claim 1, wherein the first piece of data is retrieved without relying on a sequence number.

6. The computing system of claim 1, wherein the computing system is a receiver device of the remote memory access, and wherein the remote computing system is a sender device of the remote memory access.

7. The computing system of claim 1, wherein the remote memory access is based on Remote Direct Memory Access (RDMA) from the computing system.

8. A method comprising:
receiving, by a receiver device via a network from an application running on a sender device storing a first piece of data, a first request to send the first piece of data to the receiver device, wherein the network includes a high-performance computing (HPC) fabric that supports the retrieval of the first piece of data based on a rendezvous protocol supported by the HPC fabric, and wherein the rendezvous protocol supports sending of the first request for the first piece of data and retrieval of the first piece of data based on remote memory access;
determining that the first request is among a plurality of requests to send data to the receiver device received from a plurality of sender devices accessible via the network;
determining a storage location of the first piece of data at the sender device based on a descriptor in the first request;
determining a number of the plurality of requests as a degree of incast at the receiver device;
scheduling, by the receiver device, a time for retrieval of the first piece of data in response to the first request based on the degree of incast and with respect to the plurality of requests; and retrieving, by the receiver device, the first piece of data at the scheduled time from the storage location at the sender device based on the rendezvous protocol.

9. The method of claim 8, wherein the scheduling of the retrieval of the first piece of data comprises:
   determining whether the degree of incast is greater than a threshold value that indicates a predetermined number of computing systems sending data to the computing system; and
   in response to the degree of incast being greater than the threshold value, pausing the scheduling for a predetermined period.

10. The method of claim 8, wherein the storage location of the first piece of data at the sender device is in a sender buffer in a memory device of the sender device, and wherein the first request is generated at a network interface controller (NIC) of the sender device.

11. The method of claim 8, further comprising:
   determining, prior to retrieving the first piece of data, a location for storing the first piece of data in a receiver buffer at the receiver device; and
   storing the first piece of data at the determined location in response to retrieving the first piece of data.

12. The method of claim 8, wherein the first piece of data is retrieved without relying on a sequence number.

13. The method of claim 8, wherein scheduling the time of the retrieval of the first piece of data and the retrieving of the first piece of data are performed by a NIC of the receiver device.

14. The method of claim 8, wherein the remote memory access is based on Remote Direct Memory Access (RDMA) from the receiver device.

15. A non-transitory computer-readable storage medium comprising instructions which, when executed on a network interface controller (NIC) of a receiver device in a distributed system, cause the NIC to:
   receive, via a network from a sender device storing a first piece of data, a first request to send the first piece of data to the receiver device, wherein the network includes a high-performance computing (HPC) fabric that supports the retrieval of the first piece of data based on a rendezvous protocol supported by the HPC fabric, and wherein the rendezvous protocol supports sending of the first request for the first piece of data and retrieval of the first piece of data based on remote memory access;
   determining that the first request is among a plurality of requests to send data to the receiver device received from a plurality of sender devices accessible via the network; and
   determine a storage location of the first piece of data at the sender device based on a descriptor in the first request;
   determine a number of the plurality of requests as a degree of incast at the receiver device;
   schedule a time for retrieval of the first piece of data in response to the first request based on the degree of incast and with respect to the plurality of requests; and
   retrieve, at the scheduled time, the first piece of data from the storage location at the sender device to the NIC based on the rendezvous protocol.

16. The non-transitory computer-readable storage medium of claim 15, wherein the instructions which, when executed on the NIC, cause the NIC to:
   determine, prior to retrieving the first piece of data, a location for storing the first piece of data in a receiver buffer at receiver device; and
   store the first piece of data at the determined location in response to retrieving the first piece of data.

17. The non-transitory computer-readable storage medium of claim 15, wherein the storage location of the first piece of data at the sender device is in a sender buffer in a memory device of the sender device, and wherein the first request is generated at a second NIC of the sender device.

18. The non-transitory computer readable storage medium of claim 15, wherein the NIC schedules the retrieval of the first piece of data by:
   determining whether the degree of incast is greater than a threshold value that indicates a predetermined number of computing systems sending data to the computing system; and
   in response to the degree of incast being greater than the threshold value, pausing the scheduling for a predetermined period.

* * * * *